(12) United States Patent
Chen et al.

(10) Patent No.: US 9,276,473 B1
(45) Date of Patent: Mar. 1, 2016

(54) VOLTAGE CONVERTING CONTROLLER AND METHOD OF VOLTAGE CONVERTING CONTROL

(71) Applicant: RICHTEK TECHNOLOGY CORP, Hsinchu (TW)

(72) Inventors: An-Tung Chen, Hsinchu (TW); Li-Wen Fang, Hsinchu (TW); Chih-Hao Yang, Hsinchu (TW); Yu-Chiao Hsieh, Hsinchu (TW)

(73) Assignee: RICHTEK TECHNOLOGY CORP, Hsinchu (TW)

( * ) Notice: Subject to any disclaimer, the term of this patent is extended or adjusted under 35 U.S.C. 154(b) by 0 days.

(21) Appl. No.: 14/591,250

(22) Filed: Jan. 7, 2015

(30) Foreign Application Priority Data

Oct. 3, 2014 (TW) .............................. 103134587 A (51) Int. Cl.
*G05F 1/00* (2006.01)
*H02M 3/158* (2006.01)

(52) U.S. Cl.
CPC ..................................... *H02M 3/158* (2013.01)

(58) Field of Classification Search
CPC .................................. H02M 3/158; G05F 1/00
USPC ................................................. 323/282–288
See application file for complete search history.

(56) References Cited

U.S. PATENT DOCUMENTS

| 7,595,624 B2* | 9/2009 | Tateishi | H02M 3/158 323/271 |
| 8,022,680 B2* | 9/2011 | Ryoo | H02M 3/156 323/282 |
| 8,305,053 B2* | 11/2012 | Truong | H02M 3/158 323/224 |
| 8,513,933 B2* | 8/2013 | Notman | H02M 3/1588 323/284 |
| 2014/0009130 A1* | 1/2014 | Galbis | G05F 1/46 323/271 |

* cited by examiner

*Primary Examiner* — Timothy J Dole
*Assistant Examiner* — Htet Z Kyaw
(74) *Attorney, Agent, or Firm* — Chun-Ming Shih; HDLS IPR Services (57) ABSTRACT

A voltage converting controller is applied to a switching voltage converting circuit, in which the voltage converting controller periodically operates a high-side power switch and a low-side power switch in the switching voltage converting circuit with a high-side control signal and a low-side control signal, respectively, so as to convert an input voltage into an output voltage via an inductor. Defining an ideal duty cycle as the rating value of the output voltage divided by the value of the input voltage, when the ideal duty cycle is less than one threshold duty cycle, then the period of the high-side control signal is a constant; and when the ideal duty cycle is greater than the threshold duty cycle, the period of the high-side control signal and the period of the ideal duty cycle are positively correlated.

12 Claims, 10 Drawing Sheets

VOLTAGE CONVERTING CONTROLLER AND METHOD OF VOLTAGE CONVERTING CONTROL

CROSS-REFERENCES TO RELATED APPLICATIONS

This non-provisional application claims priority under 35 U.S.C. §119(a) on Patent Application No. 103134587 filed in Taiwan, R.O.C. on 2014 Oct. 3, the entire contents of which are hereby incorporated by reference.

BACKGROUND

1. Technical Field

The this disclosure relates to a voltage converting controller and a method of the voltage converting control, particularly to a voltage converting controller and a method of the voltage converting control applied to the constant turn-on time control mode and make the duty cycle of the switch control signal not limited by the minimal off-time.

2. Related Art

The switching voltage converting circuit is one of various the voltage converting circuits. In a switching voltage converting circuit, the power switch is used to modulate the energy stored in an inductive component to supply to the output load, and an input voltage is converted into an output voltage at an output terminal to maintain the fixed output voltage value, and the switching voltage converting circuit provides the output load the required load current. The advantage of the switching voltage converting circuit is that the high conversion efficiency is achieved, thus it can reduce unnecessary heat generation and furthermore reduce the complexity of the heat dissipation design.

Figure 1:
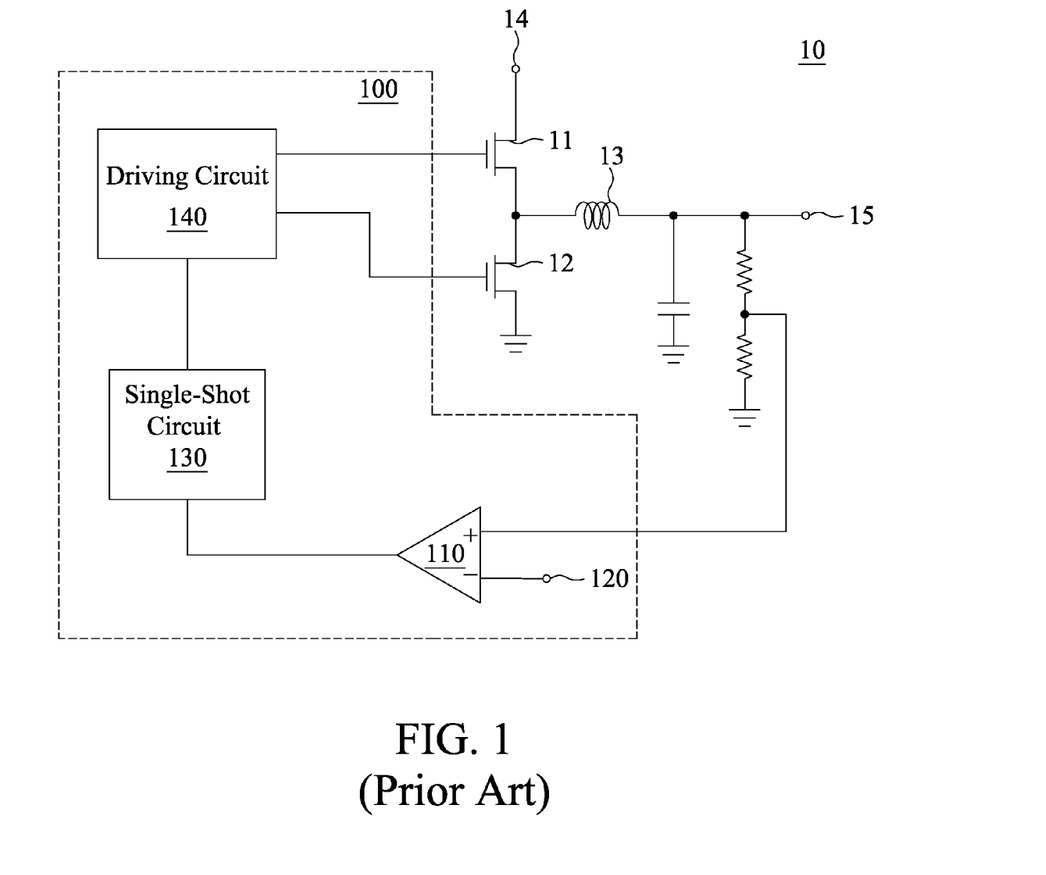
FIG. 1 is a voltage converting controller of constant-turn-on time control mode and a switch voltage converting circuit having the voltage converting controller in the art.

FIG. 1 shows a voltage converting controller 100 of the constant-turn-on time control mode in the art. The voltage converting controller 100 is applied to the switching voltage converting circuit 10. The switching voltage converting circuit 10 turns on the high-side power switch 11 and the low-side power switch 12 in a non-overlapping way, respectively; and the switching voltage converting circuit 10 converts the input voltage 14 into an output voltage 15 via the inductor 13 and provides the required load current. The voltage converting controller 100 receives the output voltage 15 or the voltage division of the output voltage 15 via a comparator 110, and compares the received voltage with a reference voltage 120. When the output voltage 15 or the voltage division of the output voltage 15 is less than the reference voltage 120, the comparator 110 sends out a comparison signal to trigger a single-shot circuit 130 to generate a signal of fixed pulse width. And during the period of the foregoing fixed pulse width the driving circuit 140 is used to control the channel of the high-side power switch 11 to be turned on, such that the input voltage 14 supplies the current to the output voltage 15 via the inductor 13. After the end of the foregoing fixed pulse width, the driving circuit 140 controls the channel of the low-side power switch 12 to be turned on.

Figure 2:
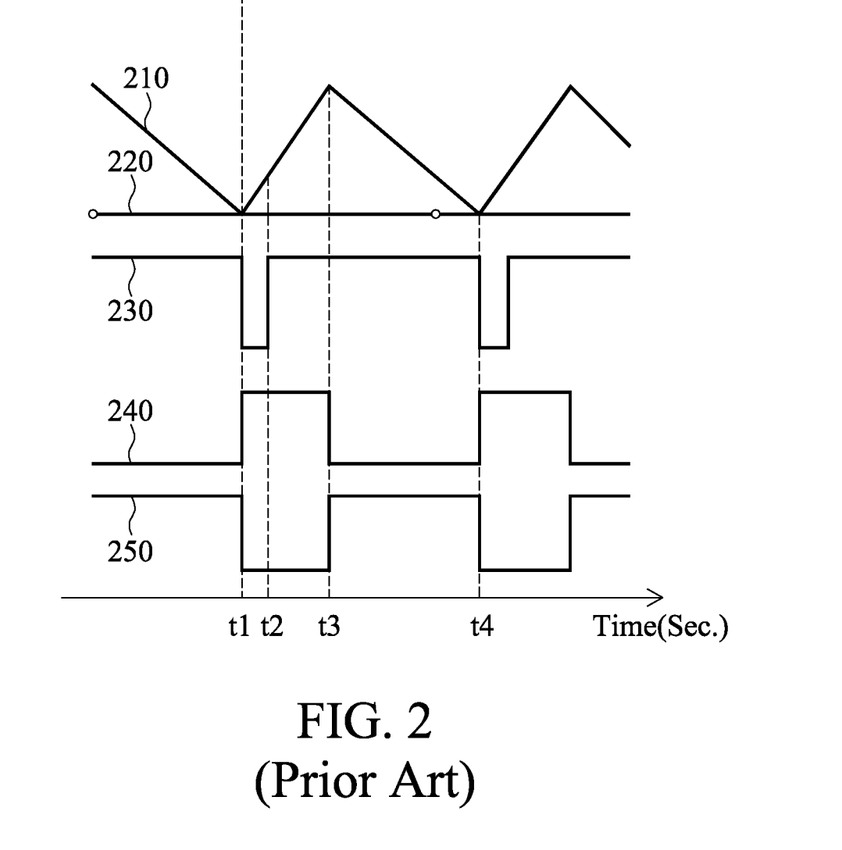
FIG. 2 is the control time sequence diagram of the switch voltage converting circuit in the steady-state normal operation in the art.

FIG. 2 is the control time sequence diagram of the switch voltage converting circuit 10 in the steady-state normal operation. The waveform 210 represents the output voltage 15 or its voltage division that the comparator 110 receives. The waveform 220 represents the reference voltage 120. The waveform 230 represents the output signal of the comparator 110. The waveform 240 represents the control signal of the high-side power switch 11. The waveform 250 represents the control signal of the low-side power switch 12. Before the time t1, the channel of the high-side power switch 11 is cut off, while the channel of the low-side power switch 12 is turned on, thus the waveform 210 shows the output voltage 15 or its voltage division decreasing. At the time t1, the voltage value of the waveform 210 starts to be less than the reference voltage 220. Hence, the comparator 110 responds to output the comparison signal, i.e., as described in the waveform 230, and triggers the single-shot circuit 130, thus the driving circuit 140 controls the channel of the high-side power switch 11 to be turned on and the channel of the low-side power switch 12 to be cut off, i.e., as shown in the waveform 240 and the waveform 250. Then the output voltage 15 begins to rise, that is, as shown in the waveform 210. It is noted that in a common comparator 110 applied to the voltage converting controller 100 has the characteristics of the hysteresis. Namely the input comparison level of the comparator 110 determines its output signal, so as to make the output results of the comparator more stable and reduce the unnecessary output jitter noise. This is art for a person having ordinary skill in the art, the details will not be discussed hereinafter.

Furthermore, when the output voltage 15 rises, up to the time t2, the comparator 110 based on its design in the hysteresis region recovers the output signal of the comparator 110. At the time t3, the fixed pulse width of the single-shot circuit 130 is ended, and the driving circuit 140 controls the channel of the high-side power switch 11 to be cut off and the channel of the low-side power switch 12 to be turned on, the output voltage of 15 begins to decline. Until the time t4, the voltage value of the waveform 210 starts again to be less than the reference voltage 220, and therefore it repeats the actions at the time t1.

The advantage of the constant-turn-on time control mode is that the operating clock frequency of the circuit and the load current are a positive correlation. When the load current is light load, the operating clock frequency is lower, reducing the switching loss, thus enhancing the power conversion efficiency. In addition, even if it is designed to be the fixed frequency operation, such as the design that will be described hereinafter, the circuit components of the constant-turn-on time control mode is also relatively simple with larger bandwidth of the loop circuits, which is beneficial for the fast transient responses.

However, when the channel of the high-side power switch 11 is cut off and the channel of the low-side power switch 12 is turned on, at this time due to the transient changes in the current loop it will transmit greater noise interference. The control signal of the power switches are easily influenced, hence, it may cause the control signal to be affected and turned on again shortly after the channel of the high-side power switch 11 starts to be cut off. To avoid this kind of mistaken action, usually the control signal of the high-side power switch 11 has the limitation of the so-called minimal off-time, in order to filter out the transient interference. However, the constant channel turn-on time of the high-side power switch 11, and the limitation of the minimal off-time result in that the duty cycle of the control signal of the high-side power switch 11 has its upper limit, so that within the specification of a rating output voltage 15 the input voltage 14 of the switch voltage converting circuit 10 has the limitation of a minimum value. This restriction is not good for the applications of the use of the batteries to supply the electricity, because the battery voltage lowers down obviously with the process of the electricity supply.

Figure 3:
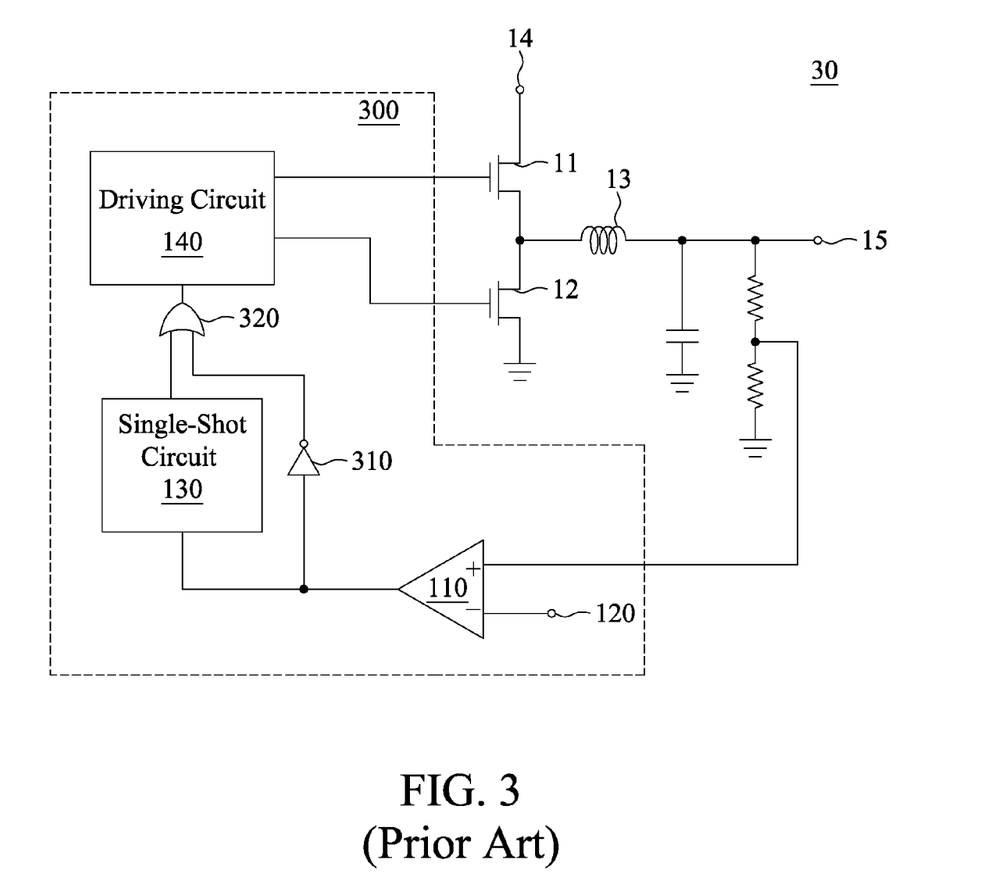
FIG. 3 is another voltage converting controller of constant-turn-on time control mode and a switch voltage converting circuit having the voltage converting controller in the art.

FIG. 3 is another voltage converting controller 300 of the constant-turn-on time control mode in the art. The voltage converting controller 300 is applied to the switch voltage converting circuit 30. The difference between the voltage converting controller 300 and the voltage converting controller 100 as shown in FIG. 1 lies in that between the single-shot circuit 130 and the driving circuit 140, an OR gate 320 is added and the input of the OR gate 320 is connected to the output terminal of the single-shot circuit 130 and the inversion output (provided by the NOT gate 310) of the comparator 110, respectively. The switch voltage converting circuit 30 can break through the upper limitation of the duty cycle of the control signal of the foregoing high-side power switch 11.

Figure 4A:
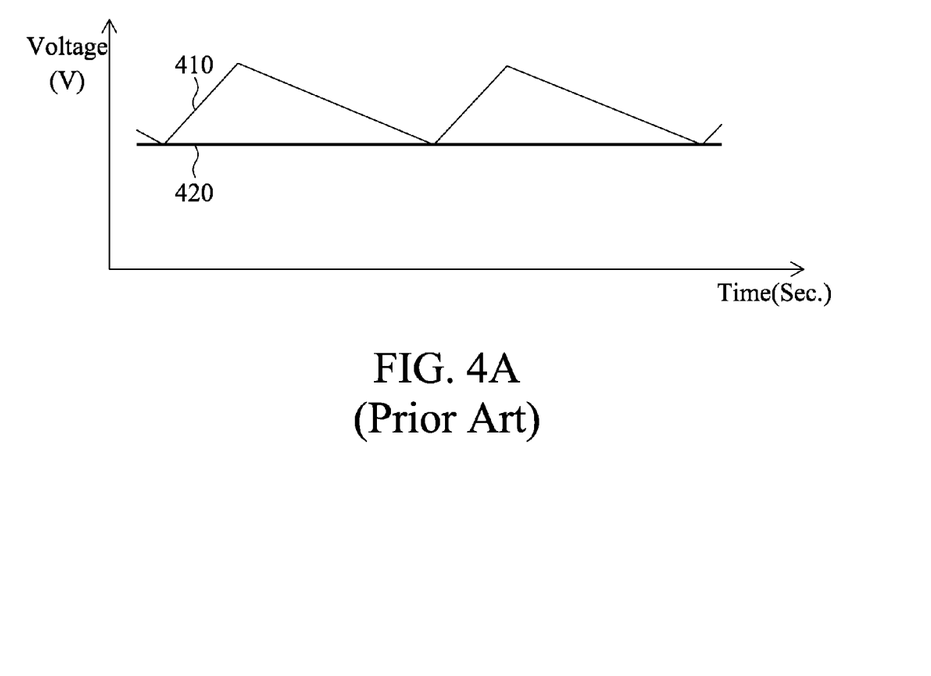
FIG. 4A is the control time sequence diagram of the switch voltage converting circuit in the steady state normal operation, as shown in FIG. 3.
Figure 4B:
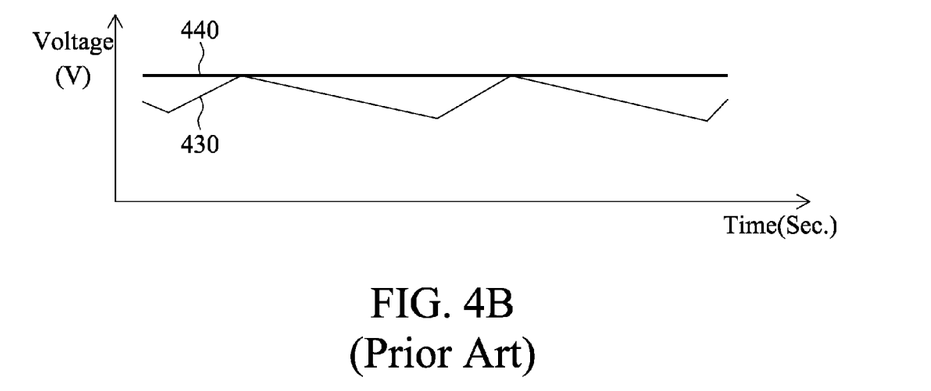
FIG. 4B is another control time sequence diagram of the switch voltage converting circuit in the steady state normal operation, as shown in FIG. 3.

FIG. 4A and FIG. 4B are the control time sequence diagrams of the switch voltage converting circuit 30 in the conditions of steady-state normal operation. In the diagrams, the waveforms 410 and 430 represent the received output voltage 15 or its voltage division value of the comparator 110. The waveforms 420 and 440 represent the reference voltage 120. As described in FIG. 4A, when the duty cycle of the control signal of the high-side power switch 11 does not exceed the limitation of its upper limit, the operation of the switch voltage converting circuit 30 is just the same as the switch voltage converting circuit 10. However, when the duty cycle of the control signal of the high-side power switch 11 exceeds the limitation of its upper limit, due to the output voltage 15 or its voltage division value still not being able to be greater than the reference voltage 120 at the end of the fixed pulse width of the single-shot circuit 130, thus the output of the OR gate 320 is determined by the inversion output of the comparator 110 until the output voltage 15 or its voltage division value greater than the reference voltage 120. The output of the OR gate 320 just shifts the state, so that the driving circuit 140 controls the channel of the low-side power switch 12 to be turned on and maintains a span of the "minimum off-time". However, from FIG. 4A and FIG. 4B we know that in both cases, the value of the output voltage 15 still has a larger gap.

SUMMARY

In view of the foregoing problems, this disclosure mainly provides a voltage converting controller and the method of voltage converting control, in particular, to the voltage converting controller and the method of voltage converting control applied to the constant-turn-on time control mode. And the voltage converting controller and the method of voltage converting control are able to have the duty cycle of the switch control signal not limited to the minimum off-time.

This disclosure provides a voltage converting controller applied to a switch voltage converting circuit. The voltage converting controller periodically operates a high-side power switch and a low-side power switch in the switch voltage converting circuit with a high-side control signal and a low-side control signal, respectively, to convert an input voltage into an output voltage via an inductor.

In this voltage converting controller, defining an ideal duty cycle as the rating value of the output voltage divided by the input voltage value, when the ideal duty cycle is less than a threshold duty cycle the period of the high-side control signal is a constant value; and when the ideal duty cycle is greater than the threshold duty cycle the period of the high-side control signal and the ideal duty cycle are a positive correlation.

In one embodiment, the voltage converting controller further includes an output indicating voltage; a comparator, including a first input terminal, a second input terminal and a comparison output terminal, in which the first input terminal coupled to the output indicating voltage; a first current source, coupled to the second input terminal, and the magnitude of the current proportional to the input voltage; a capacitor, coupled to the second input terminal; a reset switch coupled to the capacitor, and when the channel of the high-side power switch turned on, the channel of the reset switch being cut off; and a second current generating circuit, coupled to the second input terminal; the output current of the second current generating circuit less than the current of the first current source, when the ideal duty cycle less than the threshold duty cycle the output current of the second current generating circuit being zero, and when the ideal duty cycle greater than the threshold duty cycle the output current of the second current generating circuit being positively correlated with the ideal duty cycle. The first current source charges the capacitor, and the output current of the second current generating circuit discharges the capacitor.

In one embodiment, the voltage converting controller further includes a reference voltage, the value of the reference voltage being the value of the output indicating voltage multiplied by the reciprocal of the threshold duty cycle; an amplifier including a non-inverting input terminal, an inverting input terminal and an amplification output terminal, the inverting input terminal coupled to the reference voltage; a current determining resistor, coupled between the input voltage and the non-inverting input terminal; a transistor, including a channel coupled to the non-inverting input terminal and a control terminal coupled to the amplification output terminal; and a current mirror, coupled between the control terminal of the transistor and the second input terminal, to output the current based on the magnitude of current in the channel of the transistor.

In one embodiment, the transistor is a P-type metal-oxide semiconductor field-effect transistors or to PNP-type bipolar junction transistors.

In one embodiment, the voltage converting controller further includes a reference voltage, the value of the reference voltage being the output indicating voltage multiplied by the reciprocal of the threshold duty cycle; an amplifier, including a non-inverting input terminal, an inverting input terminal and an amplification output terminal, the inverting input terminal coupled to the input voltage; a current determining resistor, coupled between the reference voltage and the non-inverting input terminal; a transistor, including a channel coupled to the non-inverting input terminal, and a control terminal coupled to the amplification output terminal; and a current mirror, coupled between the control terminal of the transistor and the second input terminal, used to output the current based on the magnitude of current in the channel of the transistor.

In one embodiment, the transistor is an N-type metal-oxide semiconductor field-effect transistors or a NPN-type bipolar junction transistor.

In one embodiment, the output indicating voltage is coupled to the output voltage, or the output indicating voltage is a fixed voltage and the value of the output indicating voltage is the rating voltage of the output voltage.

This disclosure also provides a voltage converting control method applied to a switch voltage converting circuit. The voltage converting controller periodically operates a high-side power switch and a low-side power switch in the switch voltage converting circuit with a high-side control signal and a low-side control signal, respectively, to convert an input voltage into an output voltage via an inductor.

The method of voltage converting control includes the following steps: according to the result of the output voltage divided by the input voltage, obtaining an ideal duty cycle; and determining whether the ideal duty cycle is less than a threshold duty cycle or not; if the ideal duty cycle is less than the threshold duty cycle, controlling the period of the high-side control signal to be a constant value; if the ideal duty cycle is not less than the threshold duty cycle, controlling the period of the high-side control signal to be a positive correlation with the ideal duty cycle.

In one embodiment, when the ideal duty cycle is greater than the threshold duty cycle, the turn-on time of the channel of the low-side power switch approaches to but is not less than a minimum low-side turn-on time.

In one embodiment, the switch voltage converting circuit is a step-down switch voltage converting circuit.

In this disclosure, the voltage converting controller and the method of voltage converting control make the operation clock of the voltage converting controller maintain a minimal frequency change as much as possible under the parameter settings of the minimal off-time, and make the input voltage be able to be as close to the output voltage as possible in the normal operation. Furthermore, the output voltage also will not have the changes of significant reduction. Thus at the same time it maintains the resistive capability of the control signal against the noise signals, and is suitable for the applications of the batteries to supply the electricity.

Related to the features, implementation and advantage of this disclosure are hereby described in the detailed description in accord with the drawings as in the followings.

DETAILED DESCRIPTION

In this disclosure, the term, "couple", herein includes any direct and indirect electrical connection means. Hence, if the context describes a first device coupled to a second device, it represents the first device may directly connect electrically to the second device, or indirectly connect electrically to the second device through other device or connection means.

Figure 5:
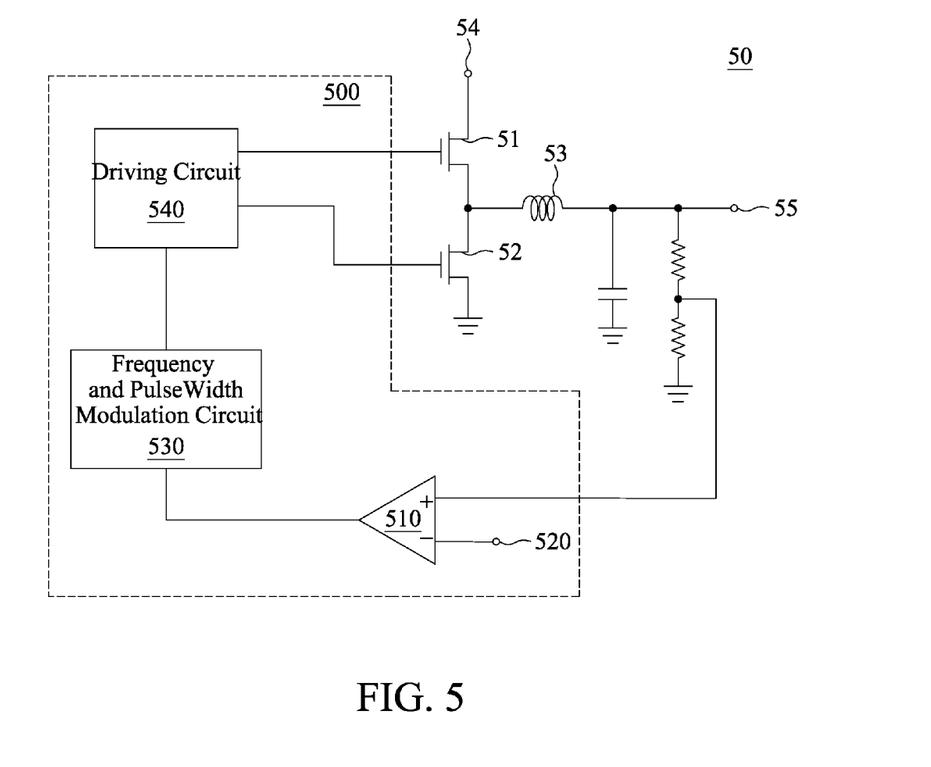
FIG. 5 is a voltage converting controller and a switch voltage converting circuit having the voltage converting controller according to an embodiment of this disclosure.

FIG. 5 is a voltage converting controller 500 and a switch voltage converting circuit 50 having voltage converting controller 500 according to an embodiment of this disclosure. The voltage converting controller 500 periodically operates a high-side power switch 51 and a low-side power switch 52 in the switch voltage converting circuit 50 with a high-side control signal and a low-side control signal, respectively, to convert the input voltage 54 into the output voltage 55 via an inductor 53.

Defining an ideal duty cycle as the rating value of the output voltage 55 divided by the value of the input voltage 54; when the ideal duty cycle is less than a threshold duty cycle the period of the high-side control signal is a constant value, and when the ideal duty cycle is greater than the threshold duty cycle the period of the high-side control signal is positively correlated with the ideal duty cycle.

In this disclosure, the so-called rating value of the output voltage is a constant voltage value of the output voltage used to supply the post-stage load when the switch voltage converting circuit in the general state of normal operation. The output voltage operated at the rating value makes the switch voltage converting circuit to have the circuit performance designated by the products specifications, such as the response time of the light load converting to the heavy load, output current capability, etc. If the output voltage is operated at greater than the rating value, the circuit performance not only fails to achieve the specified products specifications, it is more likely to cause the shortened lifetime, and even cause the immediate damages.

Through the control method of the voltage converting controller 500, the voltage converting controller 500 can be operated with the fixed clock frequency when the ideal duty cycle is less than the threshold duty cycle, since the switch voltage converting circuit 50 is not limited of the foregoing minimal off-time in the operation. However, when the ideal duty cycle is greater than the threshold duty cycle, the period of the high-side control signal and the ideal duty cycle are positively correlated. That is to say, the pulse width of the high-side control signal can be correspondingly magnified in order to break through the restrictions of the minimal off-time, so that the input voltage can further approach the rating value of the output voltage, and it still maintains the normal operation. In another word, when the ideal duty cycle is greater than the threshold duty cycle, the turn-on time of the channel of the low-side power switch 52 approaches but not less than a minimum low-side turn-on time. In addition, as shown in FIG. 5, the switch voltage converting circuit 50 can be, but not limited to a step-down switch voltage converting circuit.

The voltage converting controller 500 includes a comparator 510, a reference voltage 520, a frequency and pulse width modulation circuit 530, and a driving circuit 540.

The comparator 510, the reference voltage 520 and the driving circuit 540 may be referred to the related descriptions of the comparator 110, the reference voltage 120 and the driving circuit 140 in FIG. 1 for reference. The frequency and pulse width modulation circuit 530, according to the comparison result of the comparator 510, such as the detection of the negative edge of the comparator's output signal, initiates the pulse signal of a specific width, and acts to control the channel turn-on time of the high-side power switch. It is assumed that the specific width of the foregoing pulse signal, Ton, is designed as Ton=Vout/Vin/Fs, where Vout is the output voltage, Vin is the input voltage, then the operation clock of the voltage converting controller 500 is just Fs.

Figure 6:
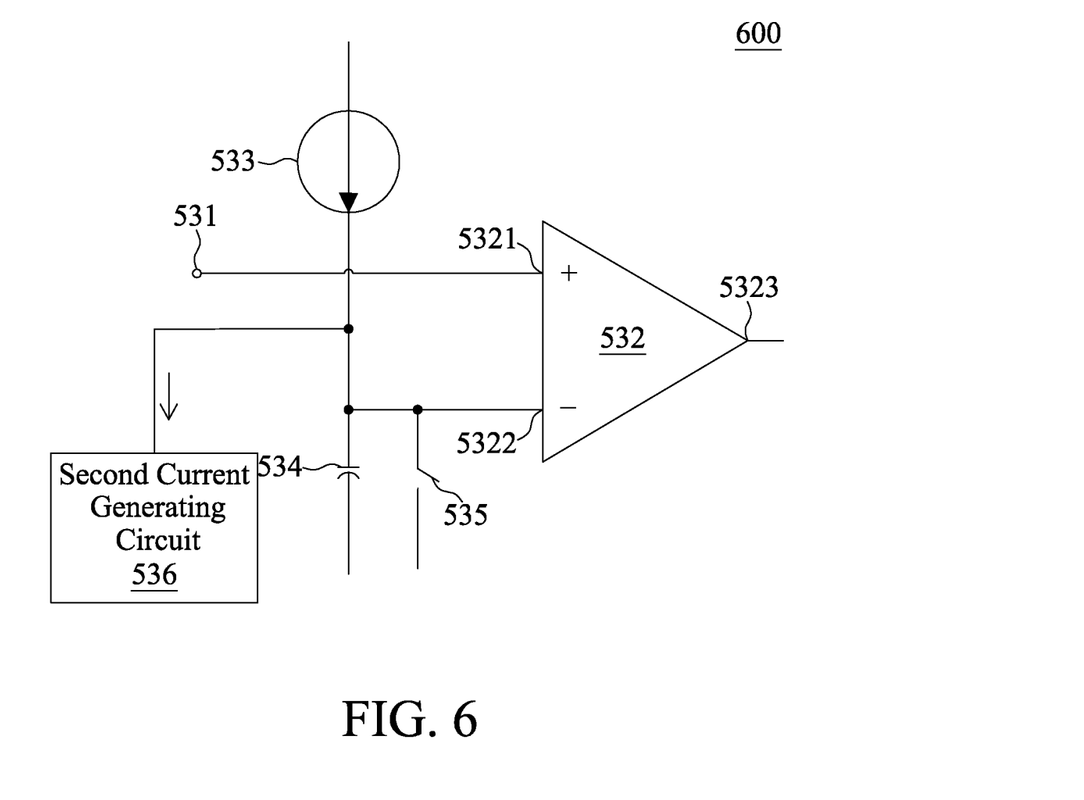
FIG. 6 is an example of a pulse width setting circuit in a frequency and pulse width modulation circuit to the embodiment of this disclosure.

FIG. 6 is an example of the pulse width setting circuit 600 in the frequency and pulse width modulation circuit 530. The pulse width setting circuit 600 includes an output indicating voltage 531, a comparator 532, a first current source 533, a capacitor 534, a reset switch 535 and a second current generating circuit 536.

The output indicating voltage 531 is coupled to the output voltage 55, or the output indicating voltage 531 is a constant voltage, and the value of the output indicating voltage 531 is the rating value of the output voltage. The comparator 532 includes a first input terminal 5321, a second input terminal 5322, and a comparison output terminal 5323. The first input terminal 5321 is coupled to the output indicating voltage 531. The first current source 533 is coupled to the second input terminal 5322, and the magnitude of the current is proportional to the input voltage 54.

The capacitor 534 is coupled to the second input terminal 5322. One end of the reset switch 535 is coupled to the capacitor 534 and the second input terminal 5322. Since the reset switch 535 is used for resetting the charges in the capacitor 534, the reset switch 535 has to be cut off to make the capacitor 534 perform effectively the charging and discharging behavior during the period of the Ton. Thus when the channel of the high-side power switch 51 is turned on, the channel of the reset switch 535 is cut off. In addition, the reset switch 535 is coupled in parallel to the capacitor 534, or has one end coupled to the capacitor 534 while another end is coupled to a certain electrical potential. In this embodiment, it is described by the reset switch 535 coupled in parallel to the capacitor 534, but is not limited to this case.

The second current generating circuit 536 is coupled to the second input terminal 5322. The output current of the second current generating circuit 536 is less than the current of the first current source 533. When the ideal duty cycle is less than the threshold duty cycle, the output current of the second current generating circuit is zero. And when the ideal duty cycle is greater than the threshold duty cycle, the magnitude of the output current of the second current generating circuit 536 is positively correlated with the ideal duty cycle. The first current source 533 charges the capacitor 534 while the output current of the second current generating circuit 536 discharges the capacitor 534.

Furthermore, when the ideal duty cycle is less than the threshold duty cycle, the magnitude of the output current of the second current generating circuit 536 is zero. At this time the output indicating voltage 531, the comparator 532, the first current source 533, the capacitor 534 and the reset switch 535 set up the operation clock of the voltage converting controller 500 as a constant frequency, Fs. The description is as the followings.

Define the magnitude of the current of the first current source 533 is Vin/R, the capacitance value of the capacitor 534 is C, the output indicating voltage 531 is Vout, and R is a constant.

When the pulse width setting circuit 600 starts to calculate the specific pulse, the reset switch 535 is cut off, and the first current source 533 begins to charge the capacitor 534.

The voltage at one terminal of the capacitor is the initial value 0. At this time, the output of the comparator 532 is the digital logic "1".

After the time of C*Vout/(Vin/R), the voltage at one terminal of the capacitor is Vout. At this time, the output of the comparator 532 changes the digital logic from "1" state to "0" state.

The frequency and pulse width modulation circuit 530 uses the detection of the negative edge of the output of this one comparator 532 to end the pulse signal. It can be found that the width of the pulse signal, Ton=C*Vout/(Vin/R) =RC*Vout/Vin.

Also it is known that in the step-down switch voltage converting circuit as shown in FIG. 5, Ton=1/Fs*Vout/Vin. Therefore, the operation clock of the voltage converting controller 500 is then Fs=1/RC, i.e., a constant value.

Moreover, when the ideal duty cycle begins to be greater than the threshold duty cycle, the magnitude of the output current of the second current generating circuit 536 starts to be none-zero, and is positively correlated with the ideal duty cycle, i.e. the charging current of the capacitor 534 decreasing with the increasing ideal duty cycle. The capacitor 534 needs more time to charge from the initial zero volts to Vout, thus resulting in the further increase in the width of the pulse signal. So it can increase the actual duty cycle of the channel turn-on time of the high-side power switch 51 under the condition that the turn-on time of the channel of the low-side power switch 52 has the restriction of a minimum value.

It is noted that in the embodiment of the frequency and pulse width modulation circuit 530, the implementation method of the pulse signal is not limited to utilization of the pulse width setting circuit 600 as shown in FIG. 6. The implementation method of the pulse signal can be easily achieved by a person having ordinary skill in the art. For example, when the value of the output voltage 55 starts to be less than the reference voltage 520, it initiates and sends the pulse signal, and when the output of the comparator 532 occurs to the negative edge, it ends the pulse signal. The details of implementing the circuit of the pulse signals will not be repeated unnecessarily herein.

Figure 7:
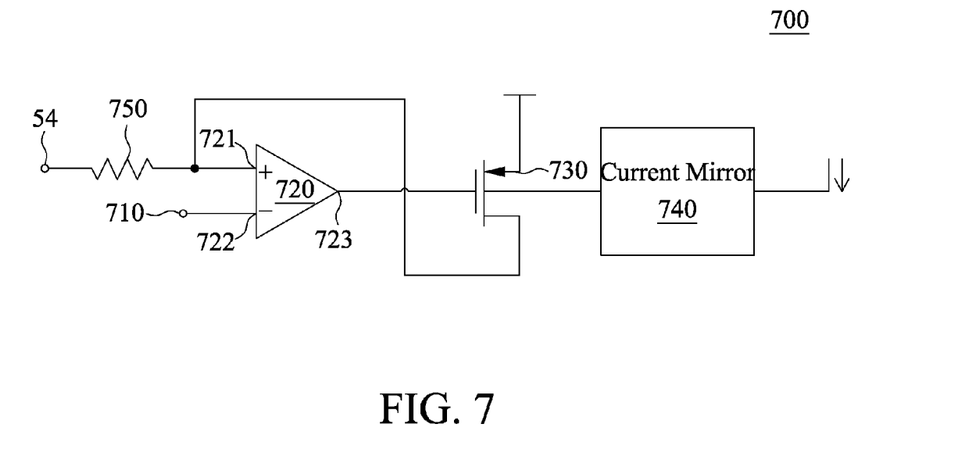
FIG. 7 is a first embodiment of the second current generating circuit in the frequency and pulse width modulation circuit in this disclosure.

FIG. 7 is a first embodiment of a second current generating circuit 536 in the frequency and pulse width modulation circuit 530, i.e., the second current generating circuit 700. The second current generating circuit 700 includes a reference voltage 710, an amplifier 720, a current determining resistor 750, a transistor 730 and a current mirror 740. The value of the reference voltage 710 is the value of the output indicating voltage 531 multiplied by the reciprocal of the threshold duty cycle. The amplifier 720 has a non-inverting input terminal 721, an inverting input terminal 722 and an amplification output terminal 723. The inverting input terminal 722 is coupled to the reference voltage 710. The current determining resistor 750 is coupled between the input voltage 54 and the non-inverting input terminal 721. The channel of the transistor 730 is coupled to the non-inverting terminal 721. The control terminal of the transistor 730 is coupled to the amplification output terminal 723. The transistor 730 is a P-type metal-oxide semiconductor field-effect transistor, MOSFET or a PNP-type bipolar junction transistor, BJT, but is not limited to these cases. The current mirror 740 is coupled to the control terminal of the transistor 730 and generates the output current of the second current generating circuit 536, which is used for determining the magnitude of the output current of the second current generating circuit 536 according to the magnitude of current of the channel of the transistor 730.

Moreover, when the input voltage 54 is greater than the reference voltage 710, i.e., when the ideal duty cycle is less than the threshold duty cycle, a negative feedback of the amplifier 720 does not occur. The channel of the transistor 730 is cut off, such that the channel current of the transistor 730 is zero, i.e. the magnitude of the output current is zero. When the input voltage 54 is less than the reference voltage 710, i.e., when the ideal duty cycle is greater than the threshold duty cycle, a negative feedback of the amplifier 720 occurs, the non-inverting input terminal 721 is biased at the voltage of the inverting input terminal 722, i.e., the reference voltage 710, assuming K*Vout. Assuming that the resistance value of the current determining resistor 750 is R1, then the channel current of the transistor 730 is (K*Vout−Vin)/R, and it forms the output current via the mirror of the current mirror 740, such that the magnitude of the current of the output current increases with the increasing ideal duty cycle, i.e., the magnitude of the output current of the second current generating circuit 536 is positively correlated with the ideal duty cycle. It is noted that the application and implementation method of the current mirror 740 is well known by a person including ordinary skill in the art, so there is no need to give unnecessary details. In addition, it is worthwhile to note that the listed voltage value and the resistance value in this embodiment are used for description, but are not intended to limit this disclosure as long as the design value can achieve the purpose of "when the ideal duty cycle is greater than the threshold duty cycle, the magnitude of the output current of the second current generating circuit 536 is positively correlated with the ideal duty cycle". This should be able to be further achieved with the ordinary knowledge in the art for a person having ordinary skills in the art, after fully understanding the above teachings. Therefore, there is no need to give unnecessary details.

Figure 8:
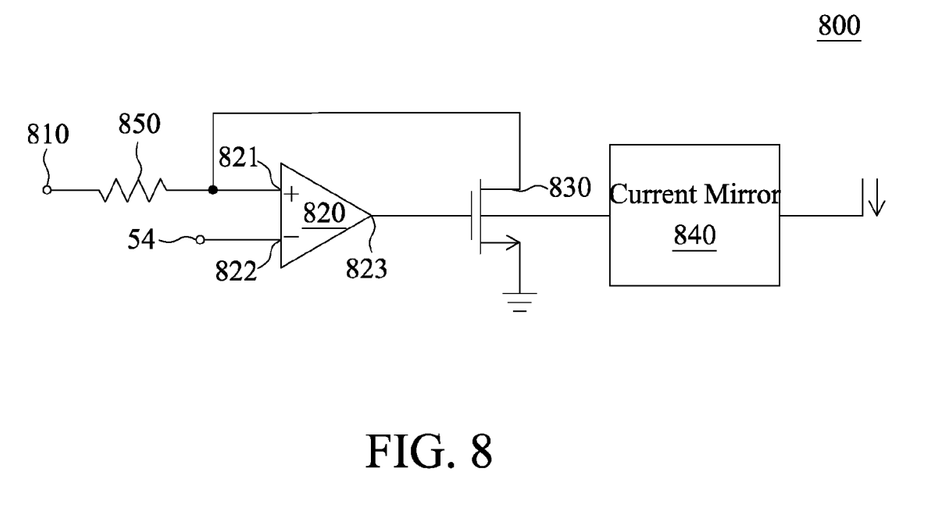
FIG. 8 is a second embodiment of the second current generating circuit in the frequency and pulse width modulation circuit in this disclosure.

FIG. 8 is a second embodiment of the second current generating circuit 536 in the frequency and pulse width modulation circuit 530, i.e., the second current generating circuit 800. The second current generating circuit 800 includes a reference voltage 810, an amplifier 820, a current determining resistor 850, a transistor 830 and the current mirror 840.

The value of the reference voltage 810 is the value of the output indicating voltage 531 multiplied by the reciprocal of the threshold duty cycle. The amplifier 820 has a non-inverting input terminal 821, an inverting input terminal 822 and an amplification output terminal 823. The inverting input terminal 822 is coupled to the input voltage 54. The current determining resistor 850 is coupled between the reference voltage 810 and the non-inverting input terminal 821. The channel of the transistor 830 is coupled to the non-inverting input terminal 821, and the control terminal of the transistor 830 is coupled to the amplification output terminal 823. The transistor 830 is an N-type metal-oxide semiconductor field-effect transistor or a NPN-type bipolar junction transistor, but is not limited to these cases. The current mirror 840 is coupled to the control terminal of the transistor 830 and generates the output current of the second current generating circuit 536, which is used for determining the magnitude of the output current of the second current generating circuit 536 according to the magnitude of current in the channel of the transistor 830.

It is further described that when the input voltage 54 is greater than the reference voltage 810, i.e., when the ideal duty cycle is less than the threshold duty cycle, a negative feedback of the amplifier 820 does not occur. The channel of the transistor 830 is cut off, such that the channel current of the transistor 830 is zero, i.e. the magnitude of output current is zero. When the input voltage 54 is less than the reference voltage 810, i.e., when the ideal duty cycle is greater than the threshold duty cycle, a negative feedback of the amplifier 820 occurs, and the non-inverting input terminal 821 is biased at the voltage of the inverting input terminal 822, i.e. the input voltage 54. Assuming the reference voltage is K*Vout. Assuming that the resistance value of the current determining resistor 850 is R1, then the channel current of the transistor 830 is (K*Vout−Vin)/R, and it forms the output current through the mirror of the current mirror 840. Therefore, the magnitude of the current of the output current increases with the increasing ideal duty cycle, i.e., the magnitude of the output current of the second current generating circuit 536 is positively correlated with the ideal duty cycle. It is noted that the applications and the implementation methods of the current mirror 840 can be easily implemented by a person having ordinary skill in the art, so there is no need to give unnecessary details.

In addition, it is worthwhile to note that the listed voltage value and the resistance value in this embodiment are used for description, but are not intended to limit this disclosure as long as the design value can achieve the purpose of "when the ideal duty cycle is greater than the threshold duty cycle, the magnitude of the output current of the second current generating circuit 536 is positively correlated with the ideal duty cycle". This should be able to be further achieved with the ordinary knowledge in the art for a person having ordinary skills in the art, after fully understanding the above teachings. Therefore, there is no need to give unnecessary details.

Figure 9A:
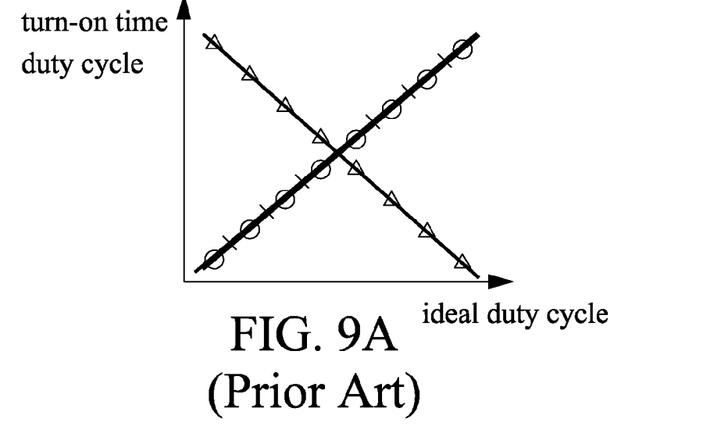
FIG. 9A is a curve diagram of the power switch turn-on time and the actual duty cycle relative to the ideal duty cycle in the art without the minimal off-time.
Figure 9B:
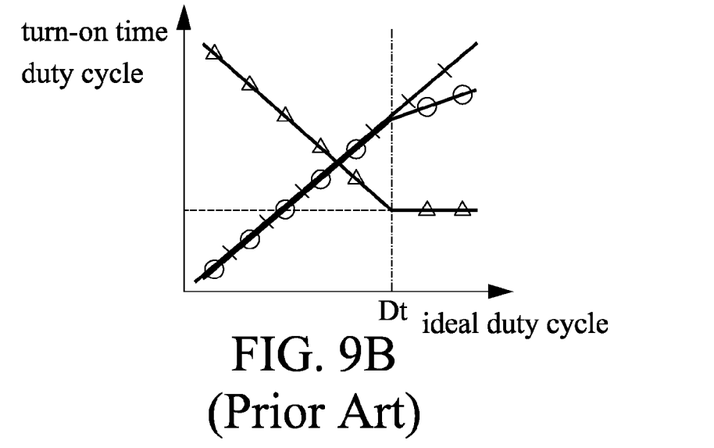
FIG. 9B is a curve diagram of the power switch turn-on time and the actual duty cycle relative to the ideal duty cycle in the art with the minimal off-time.
Figure 9C:
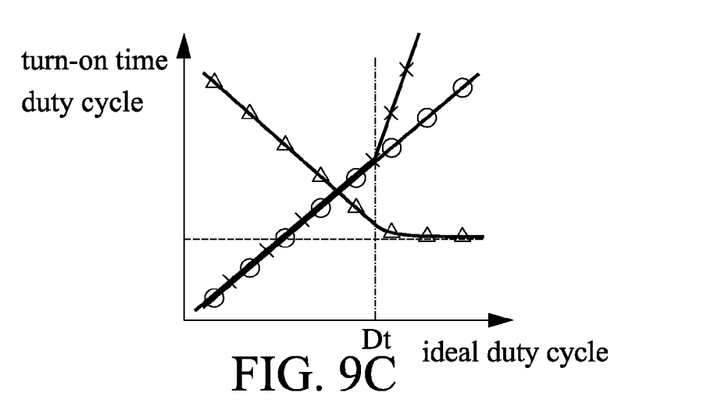
FIG. 9C is a curve diagram of the power switch turn-on time and the actual duty cycle relative to the ideal duty cycle in the voltage converting controller according to this disclosure.

FIG. 9A, 9B, 9C are the curve diagrams of the high-side power switch turn-on time, the low-side power switch turn-on time, and the actual duty cycle of the high-side power switch turned-on relative to the ideal duty cycle.

FIG. 9A, 9B, 9C corresponds to the art without the minimal off-time, the art with the minimal off-time, and the voltage converting controller 500 disclosed in this disclosure, respectively. The "X" marks shown on the curve are the high-side power switch turn-on time, the triangle marks shown on the curve are the low-side power switch turn-on time, and the "O" marks shown on the curve are the actual duty cycle of the high-side power switch turned-on.

As shown in FIG. 9A, in the art without the limitation of the minimal off-time, the low-side power switch turn-on time can be reduced unlimitedly, the duty cycle of the high-side power switch turned-on can be increased unlimitedly while it still can maintain a certain operation frequency. However, as mentioned above, the channel of the high-side power switch 11 may be affected control signal when the state is changed result in the mistaken actions which easily causes the instability in operation.

As shown in FIG. 9B, in the art with the limitation of the minimal off-time, due to the high-side power switch turn-on time and the ideal duty cycle being proportional, thus when the ideal duty cycle is greater than the threshold duty cycle, Dt, due to the low-side power switch turn-on time including a minimum value, hence the actual duty cycle of the high-side power switch turned-on is subject to the restraint, and cannot be equal to or approximate the ideal duty cycle, resulting in a decline of the output voltage, which is not good for the applications of the batteries to supply the electricity.

As shown in FIG. 9C, in the voltage converting controller 500 disclosed in this disclosure, when the ideal duty cycle is greater than the threshold duty cycle, Dt, the turn-on time of the channel of the low-side power switch approaches to but is not less than one minimum lower-side turn-on time. Then the high-side power switch turn-on time can be further increased in order to maintain the actual duty cycle of the high-side power switch turned-on to be equal to or approximate the ideal duty cycle. Therefore, in the condition of the input voltage close to the output voltage, the switch voltage converting circuit 50 still can maintain the normal operation, very suitable for the applications of the batteries to supply the electricity.

Figure 10:
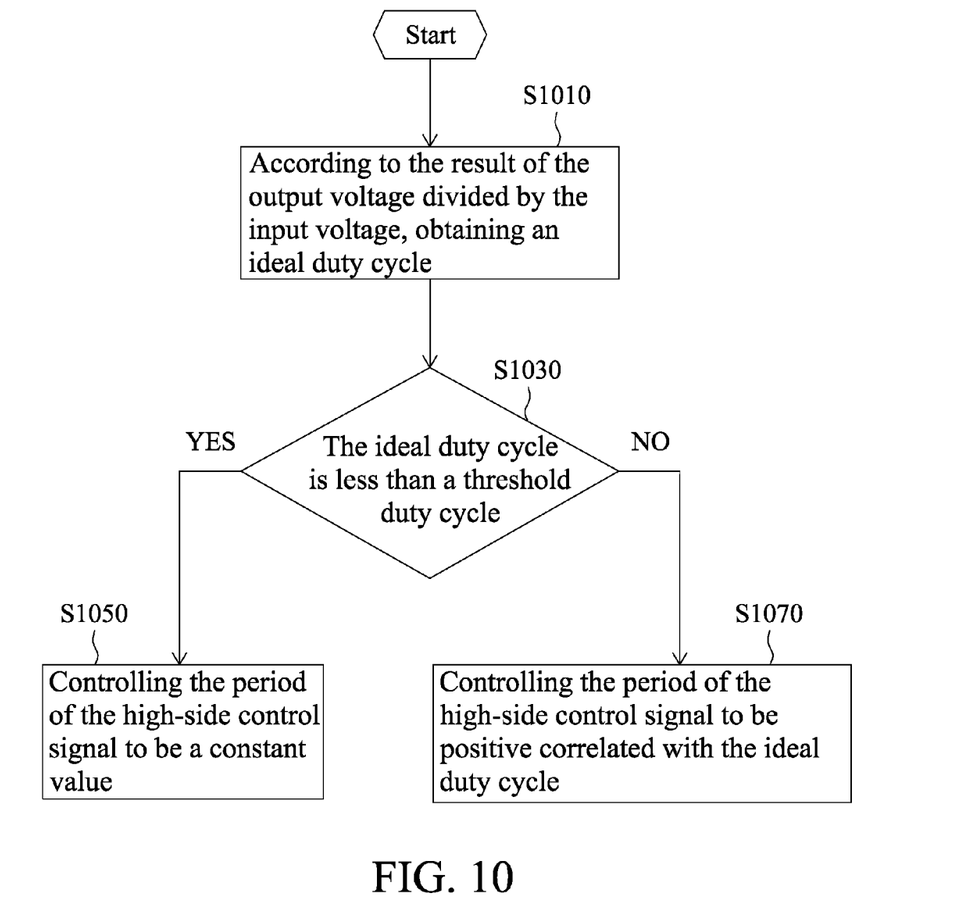
FIG. 10 is a method of voltage converting control according to this disclosure.

FIG. 10 is the voltage converting control method applied to a switch voltage converting circuit according to the embodiments of this disclosure. The switch voltage converting circuit operates periodically the high-side power switch and the low-side power switch in the switch voltage converting circuit with the high-side control signal and the low-side control signal, respectively, to convert the input voltage into the output voltage via the inductor. The voltage converting control method includes the following steps.

As shown in the step S1010, according to the result of the output voltage divided by the input voltage, an ideal duty cycle is obtained.

As shown in the step S1030, determine whether the ideal duty cycle is greater than a threshold duty cycle. If the ideal duty cycle is greater than the threshold duty cycle, then the step S1050 is executed; if the ideal duty cycle is not greater than the threshold duty cycle, the step S1070 is executed.

As shown in the step S1050, control the period of the high-side control signal as a constant value.

As shown in the step S1070, control the period of the high-side control signal to be positively correlated with the ideal duty cycle.

In addition, in the step S1070, the channel turn-on time of the low-side power switch can approach but is not less than a minimum low-side turn-on time.

Moreover, in the voltage converting control method of this disclosure, the switch voltage converting circuit is a step-down switch voltage converting circuit, but is not limited to this case.

The voltage converting control method disclosed in this disclosure can maintain the parameter settings of the minimal off-time, and still can make the operation clock of the voltage converting control circuit maintain a minimal frequency change as much as possible, and make the input voltage be able to be as close to the output voltage as possible and still maintain the normal operation. The output voltage also will not have the changes of significant reduction. Thus at the same time it maintains the resistive capability of the control signal against the noise signals, and is suitable for the applications of the batteries to supply the electricity.

What is claimed is:

1. A voltage converting controller, applied to a switch voltage converting circuit, periodically operating a high-side power switch and a low-side power switch in the switch voltage converting circuit with a high-side control signal and a low-side control signal, respectively, so as to convert an input voltage into an output voltage via an inductor;
wherein the voltage converting controller is arranged such that:
defining an ideal duty cycle as the rating value of the output voltage divided by the input voltage value, when the ideal duty cycle is less than a threshold duty cycle the period of the high-side control signal is a constant value, and when the ideal duty cycle is greater than the threshold duty cycle the period of the high-side control signal and the ideal duty cycle are a positive correlation.

2. The voltage converting controller of claim 1, wherein when the ideal duty cycle is greater than the threshold duty cycle, the channel turn-on time of the low-side power switch approaches to but is not less than a minimum low-side turn-on time.

3. The voltage converting controller of claim 1, wherein the switch voltage converting circuit is a step-down switch voltage converting circuit.

4. The voltage converting controller of claim 1, further comprising:
an output indicating voltage;
a comparator, including a first input terminal, a second input terminal, and a comparison output terminal; wherein the first input terminal is coupled to the output indicating voltage;
a first current source, coupled to the second input terminal, and the magnitude of the current being proportional to the input voltage;
a capacitor, coupled to the second input terminal;
a reset switch, including one end coupled to the capacitor and the second input terminal, wherein when the channel of the high-side power switch is turned on, the channel of the reset switch is cut off; and
a second current generating circuit, coupled to the second input terminal; wherein the output current of the second current generating circuit is less than the current of the first current source, and when the ideal duty cycle is less than the threshold duty cycle, the output current of the second current generating circuit is zero, and when the ideal duty cycle is greater than the threshold duty cycle, the magnitude of the output current of the second current generating circuit is positively correlated with the ideal duty cycle;
wherein the first current source charges the capacitor, while the output current of the second current generating circuit discharges the capacitor.

5. The voltage converting controller of claim 4, wherein the second current generating circuit comprises:
a reference voltage, in which the value of the reference voltage is the value of the output indicating voltage multiplied by the reciprocal of the threshold duty cycle;
an amplifier, including a non-inverting input terminal, an inverting input terminal, and an amplification output terminal; and the inverting input terminal coupled to the reference voltage;
a current determining resistor, coupled between the input voltage and the non-inverting input terminal;
a transistor, including a channel coupled to the non-inverting input terminal and a control terminal coupled to the amplification output terminal; and
a current mirror, coupled to the control terminal of the transistor and generating the output current of the second current generating circuit, for determining the magnitude of the output current of the second current generating circuit according to the magnitude of current in a channel of the transistor.

6. The voltage converting controller of claim 5, wherein the transistor is a P-type metal-oxide semiconductor field-effect transistors or a PNP-type bipolar junction transistors.

7. The voltage converting controller of claim 5, wherein the output indicating voltage is coupled to the output voltage or the output indicating voltage is a constant voltage and the value of the output indicating voltage is the rating value of the output voltage.

8. The voltage converting controller of claim 4, wherein the second current generating circuit comprises:
a reference voltage, in which the value of the reference voltage is the output indicating voltage multiplied by the reciprocal of the threshold duty cycle;
an amplifier, including a non-inverting input terminal, an inverting input terminal and an amplification output terminal; and the inverting input terminal coupled to the input voltage;
a current determining resistor, coupled between the reference voltage and the non-inverting input terminal;
a transistor, including a channel of the transistor coupled to the non-inverting input terminal and a control terminal coupled to the amplification output terminal; and a current mirror, coupled to the control terminal of the transistor and generating the output current of the second current generating circuit, for determining the magnitude of the output current of the second current generating circuit according to the magnitude of current in the channel of the transistor.

9. The voltage converting controller of claim 8, wherein the transistor is an N-type metal-oxide semiconductor field-effect transistors or a NPN-type bipolar junction transistors.

10. A method for voltage converting control, applied to a switch voltage converting circuit, wherein the switch voltage converting circuit operates periodically a high-side power switch and a low-side power switch in the switch voltage converting circuit with a high-side control signal and a low-side control signal, respectively, so to convert an input voltage into an output voltage via an inductor; the voltage converting control method comprising the following steps:

according to the result of the output voltage divided by the input voltage, obtaining an ideal duty cycle; and determining whether the ideal duty cycle is less than a threshold duty cycle; if the ideal duty cycle is less than the threshold duty cycle, controlling the period of the high-side control signal to be a constant value; if the ideal duty cycle is not less than the threshold duty cycle, controlling the period of the high-side control signal to be positive correlated with the ideal duty cycle.

11. The voltage converting control method of claim 10, wherein when the ideal duty cycle is greater than the threshold duty cycle, the turn-on time of the channel of the low-side power switch approaches but is not less than a minimum low-side turn-on time.

12. The voltage converting control method of claim 10, wherein the switch voltage converting circuit is a step-down switch voltage converting circuit.

\* \* \* \* \*